United States Patent
Loh et al.

(10) Patent No.: US 9,990,289 B2
(45) Date of Patent: Jun. 5, 2018

(54) SYSTEM AND METHOD FOR REPURPOSING DEAD CACHE BLOCKS

(71) Applicant: Advanced Micro Devices, Inc., Sunnyvale, CA (US)

(72) Inventors: Gabriel H. Loh, Bellevue, WA (US); Derek R. Hower, Seattle, WA (US); Shuai Che, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 261 days.

(21) Appl. No.: 14/491,296

(22) Filed: Sep. 19, 2014

(65) Prior Publication Data

US 2016/0085677 A1   Mar. 24, 2016

(51) Int. Cl.
*G06F 12/08* (2016.01)
*G06F 12/0815* (2016.01)
*G06F 12/0864* (2016.01)
*G06F 12/0891* (2016.01)

(52) U.S. Cl.
CPC ...... *G06F 12/0815* (2013.01); *G06F 12/0864* (2013.01); *G06F 12/0891* (2013.01); *Y02B 60/1225* (2013.01)

(58) Field of Classification Search
None
See application file for complete search history.

(56) References Cited

U.S. PATENT DOCUMENTS

| | | | | |
|---|---|---|---|---|
| 6,049,847 A * | 4/2000 | Vogt | ...................... | G06F 12/082 710/309 |
| 7,213,106 B1 * | 5/2007 | Koster | ................ | G06F 12/0833 711/119 |
| 7,934,054 B1 * | 4/2011 | Moll | ..................... | G06F 1/3203 345/541 |
| 2006/0179221 A1 * | 8/2006 | Levenstein | ......... | G06F 12/0855 711/118 |
| 2010/0064107 A1 * | 3/2010 | Eddy | ................... | G06F 12/0811 711/146 |
| 2013/0346697 A1 * | 12/2013 | Alexander | .......... | G06F 12/0811 711/122 |

OTHER PUBLICATIONS

Alaa R. Alameldeen et al., "Adaptive Cache Compression for High-Performance Processors", 31st Annual International Symposium on Computer Architecture (ISCA-31), Jun. 19-23, 2004, 12 pages.
Arkaprava Basu et al., "FreshCache: Statically and Dynamically Exploiting Dataless Ways", Computer Design (ICCD), 2013 IEEE 31st International Conference, Oct. 6-9, 2013, 8 pages.
Li Zhao et al., "NCID: A Non-inclusive Cache, Inclusive Directory Architecture for Flexible and Efficient Cache Hierarchies", ACM International Conference on Computing Frontiers, May 17-19, 2010, 10 pages.

* cited by examiner

*Primary Examiner* — Jared I Rutz
*Assistant Examiner* — Charles J Choi

(57) ABSTRACT

A processing system having a multilevel cache hierarchy employs techniques for repurposing dead cache blocks so as to use otherwise wasted space in a cache hierarchy employing a write-back scheme. For a cache line containing invalid data with a valid tag, the valid tag is maintained for cache coherence purposes or otherwise, resulting in a valid tag for a dead cache block. A cache controller repurposes the dead cache block by storing any of a variety of new data at the dead cache block, while storing the new tag in a tag entry of a dead block tag way with an identifier indicating the location of the new data.

20 Claims, 7 Drawing Sheets

SYSTEM AND METHOD FOR REPURPOSING DEAD CACHE BLOCKS

BACKGROUND

Field of the Disclosure

The present disclosure relates generally to caching in processing systems and more particularly to multilevel cache hierarchies employing a write-back policy.

Description of the Related Art

Processing systems often employ multilevel cache hierarchies to bridge the performance gap between processors and system memory. In cache hierarchies employing a write-back policy with an inclusive scheme or a non-inclusive/non-exclusive scheme, modifying a cache line in a higher level cache (or inner) cache, (e.g., an L1 cache) may result in the invalidation of a copy of that cache line in a lower level (or outer) cache, (e.g., an L2 cache) until the data is written back to the lower level cache. In some cases it may be necessary to maintain the tags associated with the invalidated cache line in the lower level cache, such as for the purposes of cache coherence, resulting in an unused or "dead" cache block with valid tags. In many instances, caches contain mostly dead cache blocks, resulting in inefficient use of the cache hierarchy that can cause unnecessary cache misses, cache re-fetches, lower performance, and higher power consumption.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate example systems and techniques for repurposing dead cache blocks so as to use these otherwise wasted cache blocks in a cache hierarchy employing a write-back policy. The cache hierarchy has a higher level (or inner) cache (e.g., an L1 cache) and a lower level (or outer) cache (e.g., an L2 cache) and employs an inclusive or non-inclusive/non-exclusive (NINE) scheme, such that one or more cache lines residing in the higher level cache also reside in the lower level cache. For a cache line residing in both the higher level cache and the lower level cache, when the cache line is modified at the higher level cache, the cache line of the lower level cache is invalidated, as it no longer contains valid data. However, the tag corresponding to the invalidated cache line may need to be maintained for purposes of a cache coherence scheme or other purposes, resulting in a valid tag for a dead cache block, which would conventionally represent wasted space in the cache. In the illustrated embodiments, the dead cache block is repurposed by replacing the invalid data with new data (that is, other valid data), and storing the new tag associated with the new data in a tag entry of a dead block tag way with an identifier, such as a pointer, to indicate that the new data is stored at the dead cache block. Alternatively, in some embodiments, the tag corresponding to the invalidated cache line may be moved to a separate tag way (e.g., a cache coherence tag way used for a cache coherence scheme), while the new tag is stored with the new data in the cache line. The dead cache block may be repurposed for any of a variety of uses, for example, the dead cache block could serve as a victim buffer, or the dead cache block could store prefetch data, duplicate data, compressed data, a combination of these, and the like.

While the embodiments described herein depict a cache hierarchy having three caches, each cache being of a different level, the techniques discussed herein likewise can be applied to any of a variety of cache hierarchy configurations, including cache hierarchies employing only two caches/two cache levels, or cache hierarchies employing more than three caches/three cache levels. Further for ease of illustration, the techniques are described in the example context of an inclusive cache hierarchy, however, the same techniques can be applied to a non-inclusive/non-exclusive cache hierarchy as well, or any other cache hierarchy employing caches that may have copies of the same cache lines at multiple caches of the cache hierarchy. Additionally, while the techniques are primarily described in the context of an L1 cache and an L2 cache, the techniques could similarly be applied between an L2 cache and an L3 cache, an L1 cache and an L3 cache, or the like.

Figure 1:
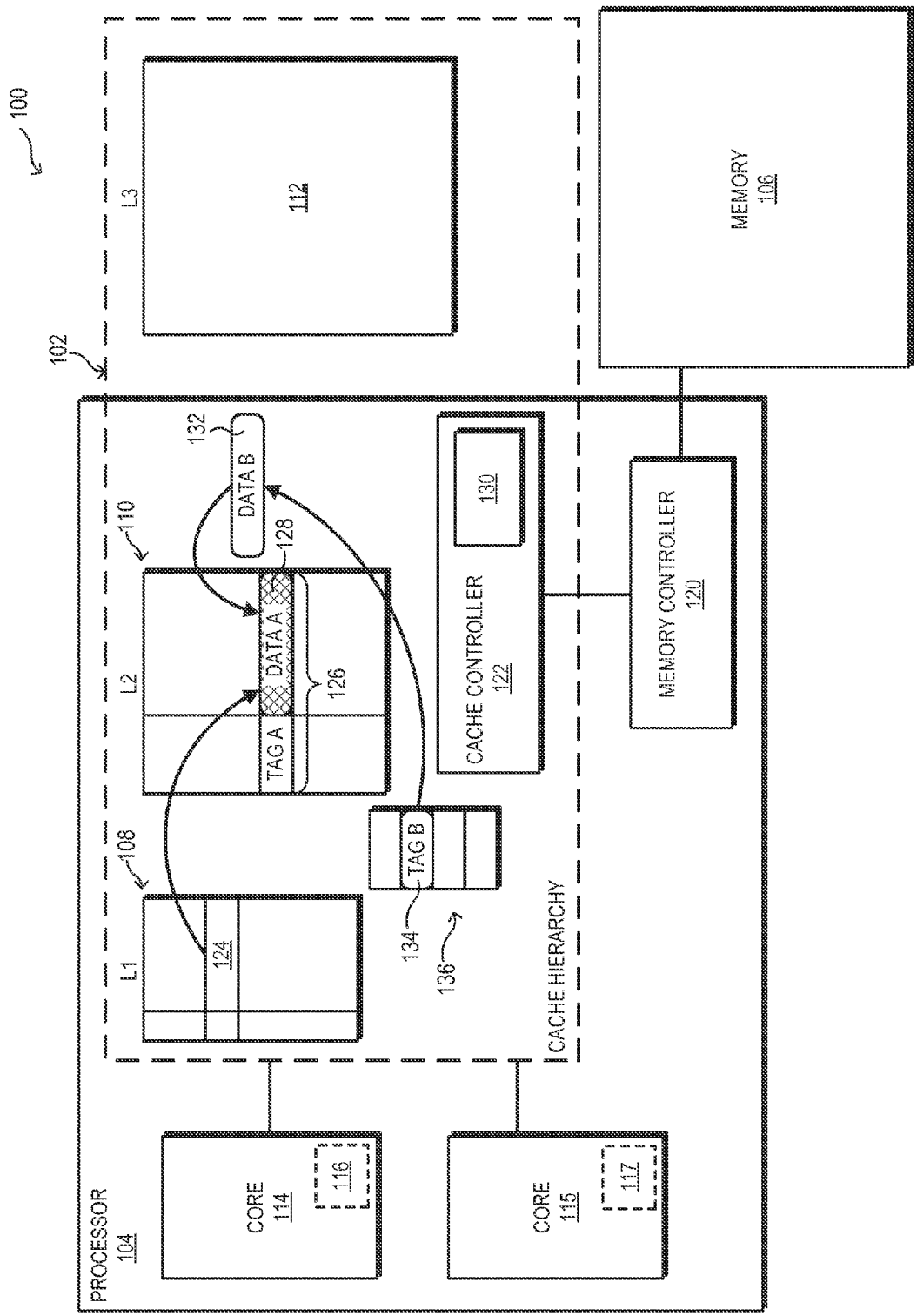
FIG. 1 is a block diagram of a processing system employing a cache block repurposing scheme in accordance with some embodiments.

FIG. 1 illustrates a block diagram of a processing system 100 employing cache hierarchy 102 utilizing a cache block repurposing scheme in accordance with some embodiments. The processing system 100 includes a processor 104, such as a central processing unit (CPU), the cache hierarchy 102, and a system (or "main") memory 106. The cache hierarchy 102 is illustrated as having three caches 108, 110, 112 of three different levels L1, L2, L3, respectively, with the L1 cache 108 comprising the highest level cache and the L3 cache 112 comprising the lowest level cache in the cache hierarchy 102. Further, as illustrated, the L1 cache 108 is smaller and faster than the L2 cache 110, which is smaller and faster than the L3 cache 112. However, other embodiments may employ any of a variety of cache hierarchies 102. For example, in some embodiments, the cache hierarchy 102 may employ additional or fewer caches. Further, the cache hierarchy 102 of some embodiments may employ additional or fewer cache levels L1, L2, L3. Each of the caches 108, 110, 112 may implement any of a variety of cache structures, for example, direct mapped cache, multi-dimensional set-associative cache, and the like. While the L1 cache 108 and the L2 cache 110 are depicted on-chip (at the processor 104) and the L3 cache 112 is depicted off-chip (not at the processor 104), other embodiments may employ any arrangement of caches, including all on-chip, all off-chip, and the like.

As illustrated, the processor 104 includes one or more processing cores 114, 115 that utilize the cache hierarchy 102 for transient storage of data, instructions, or both. While the cache hierarchy 102 is illustrated as having a single L1 cache 108 and L2 cache 110 shared by the processing cores 114, 115, the described techniques can likewise be applied to cache hierarchies 102 that employ separate L1 caches 116, 117 (or L2 caches) local to the processing cores 114, 115, respectively. Additionally, the processor 104 of different embodiments may comprise fewer or additional processing cores 114, 115, or fewer or additional local L1 caches 116, 117.

In at least one embodiment, the cache hierarchy 102 is utilized to store data or instructions (hereinafter, collectively "data") for use by the processor 104 or utilized to facilitate the transfer of data between, for example, processing cores 114, 115 and the system memory 106 through a memory controller 120. While the illustrated embodiment depicts a memory controller 120 implemented at the processor 104, in other embodiments, the memory controller 120 may be implemented elsewhere, for example, at a memory interface of a stacked memory device implementing system memory 106. The memory controller 120 generally allocates data to the system memory 106 from the caches 108, 110, 112, 116, 117 or the processing cores 114, 115, and retrieves data from the system memory 106 for the caches 108, 110, 112, 116, 117 or the processing cores 114, 115.

The processor 104 further comprises cache controller 122 to control each cache 108, 110, 112. For example, the cache controller 122 may control access to each cache 108, 110, 112, and control the transfer, insertion, and eviction of data to and from each cache 108, 110, 112. In some embodiments, the cache controller 122 may comprise multiple cache controllers, or the cache controller 122 may otherwise be physically distributed with control logic per cache. The cache controller 122 and the memory controller 120 both rely on a write policy to determine when data should be written to the caches 108, 110, 112, 116, 117 or the system memory 106. In the illustrated example, the processing system 100 employs a write-back policy, whereby data may be modified or otherwise written to a cache line 124 of a cache 108 without being written to the remaining caches 110, 112 or the system memory 106 until the cache line 124 is to be evicted, replaced, or other conditions are met.

The L2 cache 110 is depicted as an inclusive cache, such that any cache line residing in the L1 cache 108 must also reside in the L2 cache. That is, if cache line 124 comprising data "A" resides in the L1 cache 108, then a corresponding cache line 126 containing data "A" must also reside in the L2 cache 110. When cache line 124 residing in the L1 cache 108 is modified, data "A" of the corresponding cache line 126 residing in the L2 cache 110 is invalidated as having stale data. However, tag "A" corresponding to data "A" of the cache line 126 may still be valid, as it may be needed to track coherence information, sharers (i.e., which cores have copies), and the like. As a result, the cache controller 122 may maintain tag "A" for the purposes of a cache coherence scheme, resulting in a dead cache block 128. As used herein, the term "dead cache block" refers to a cache line or other cache block that stores invalid data but for which the tag may or may not be invalid (e.g., the tag may be kept or maintained for cache coherence or other purposes).

In an effort to repurpose the dead cache block 128, the cache controller 122 may maintain a dead cache block list 130 that lists or otherwise identifies dead cache blocks currently in the cache hierarchy 102. The cache controller 122 thus may use this dead cache block list 130 to allocate new data 132 to the available dead cache blocks 128 for storage in the cache 110 until the dead cache block 128 is needed again. The dead cache block list 130 may be populated based on metadata stored in tags indicating that the data is invalid, or the like. The dead cache block list 130 may comprise a table, a list, an array, or other data structure, or a combination of data structures. When the new data 132 is stored in the dead cache block 128, the tags 134 associated with the new data 132 may be stored in one or more dead block tag ways 136. That is, if the L2 cache 110 comprises a data array or other cache line array having N ways, the L2 cache 110 will also comprise a tag array having at least N+1 ways, such that one or more of the additional tag ways represent the dead block tag ways 136 for storage of metadata associated with the new data 132 stored in the dead cache block 128, as well as an identifier to indicate the location of the dead cache block 128.

For example, in the illustrated embodiment, data "A" is invalid, and therefore, the dead cache block list 130 indicates that the data portion of the cache line 126 is a dead cache block 128. Using the dead cache block list 130, the cache controller 122 allocates data "B" to the dead cache block 128 where data "A" was formerly stored. Since tag "A" is still valid, the cache controller 122 cannot store tag "B" associated with data "B" in the same cache line 126. Instead, the cache controller 122 stores tag "B" in a tag entry of a dead block tag way 136 with an identifier, for example a pointer, to indicate the location of the dead cache block 128 and therefore data "B." As a result, tag "A" can still be referenced for cache coherence purposes, and the dead cache block 128 is in use for storing valid data, resulting in a more efficient cache hierarchy 102.

This technique may also be applied in the context of a compressed cache, which makes use of more tag ways than data ways, but utilizes the fact that much data can be compressed due to common data patterns. To increase the effectiveness of compressed caches, tag "A" may be maintained for cache coherence purposes, while the corresponding dead cache block 128 may be "freed" up to store other data. This can allow a compressed cache to store more data than it otherwise could, while exploiting the otherwise unused cache capacity normally taken up by the dead cache blocks.

Figure 2:
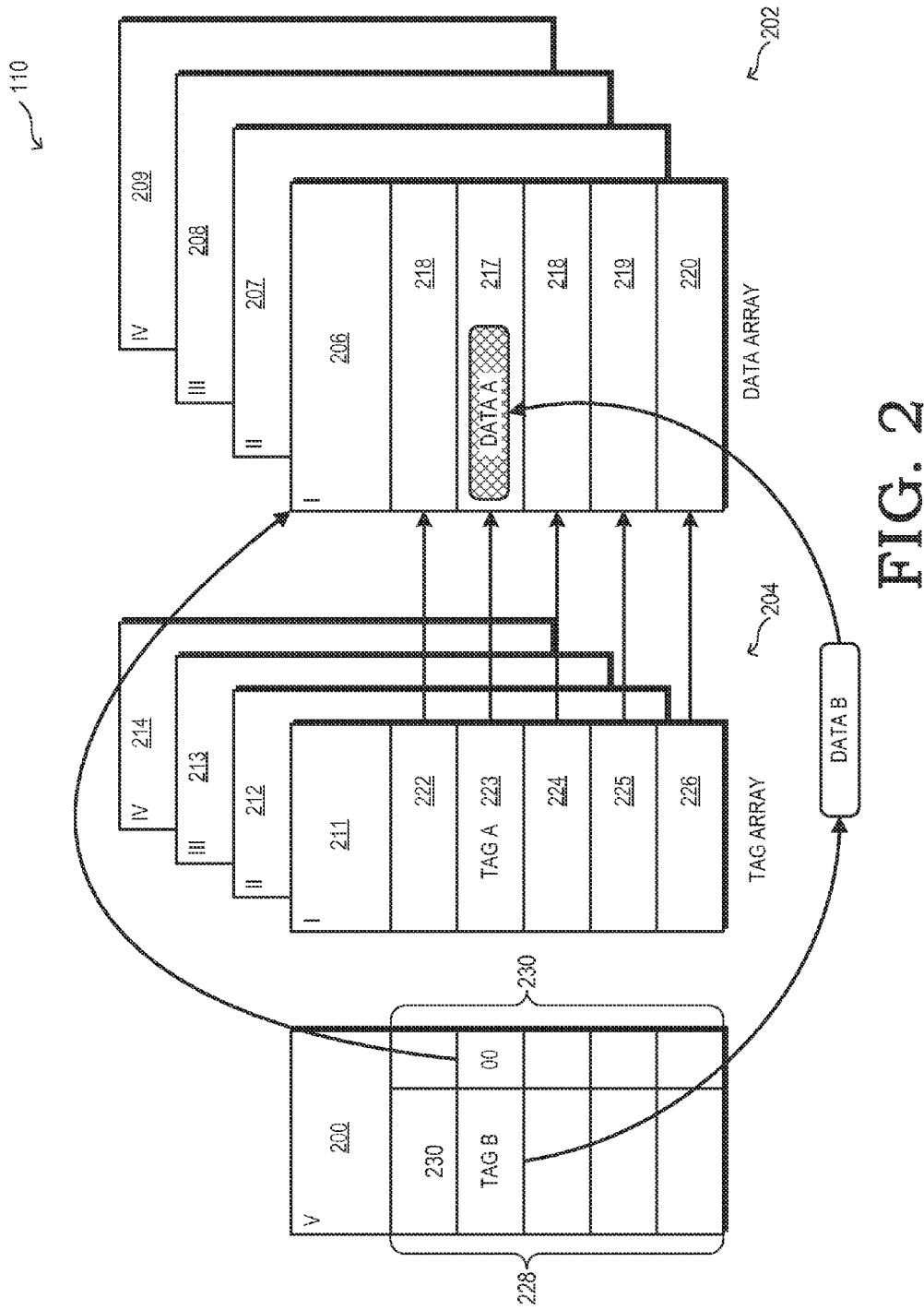
FIG. 2 is a block diagram of a cache of the processing system of FIG. 1 employing a dead block tag way in accordance with some embodiments.

FIG. 2 is a block diagram of the L2 cache 110 of the processing system 100 of FIG. 1 employing a dead block tag way 200 in accordance with some embodiments. The dead block tag way 200 represents an embodiment of the dead block tag way 136 of FIG. 1. In the depicted example, the L2 cache 110 comprises a data array 202 (or other cache line array) and a corresponding tag array 204. The data array comprises a plurality of data ways 206, 207, 208, 209, and the tag array comprises a plurality of tag ways 211, 212, 213, 214. While the illustrated embodiment depicts four (labeled, "I"-"IV") data ways 206, 207, 208, 209 and corresponding tag ways 211, 212, 213, 214, in other embodiments, the cache 110 may comprise any number of data ways in the data array with a corresponding number of tag ways in the tag array. Each data way 206, 207, 208, 209 comprises a plurality of data blocks 216, 217, 218, 219, 220, and each tag way 211, 212, 213, 214 comprises a corresponding plurality of tag entries 222, 223, 224, 225, 226, such that together, the plurality of data blocks 216, 217, 218, 219, 220 and the plurality of tag entries 222, 223, 224, 225, 226 make up a plurality of cache lines.

As described above with reference to FIG. 1, once data "A" is invalidated, the cache controller 122 identifies data block 217 as a dead cache block. Normally, the dead cache block 217 would remain unused until a write is performed based on the write policy (or the entire cache line 126 is evicted and overwritten with a new cache line in a non-inclusive/non-exclusive scheme). Unused dead cache blocks make for inefficient caches since the unused space could otherwise be filled with data and avoid unnecessary cache misses, cache re-fetches, lower performance, and higher power consumption. In an effort to repurpose the dead cache block 217, the cache controller 122 may allocate new data "B" to dead cache block 217. New data "B" may be any of a variety of data, including prefetch data, compressed data, data evicted from a different cache, and the like. The dead cache blocks 217 may be used to store additional data while reducing space overhead.

In the illustrated embodiment, since tag "A" is still valid and needed for cache coherence purposes or otherwise, the L2 cache 110 maintains tag "A" in tag entry 223. Since tag "B" associated with data "B" now stored in dead cache block 217 cannot be stored in the corresponding tag entry 223, the L2 cache 110 stores tag "B" in the dead block tag way 200. While the data array comprises N data ways (depicted as four ways labeled "I"-"IV"), the tag array comprises at least N+1 tag ways (depicted as five ways labeled "I"-"V") to allow for one or more additional ways (depicted as a single way labeled "V") to maintain tags associated with data stored in dead cache blocks. The dead block tag way 200 comprises a set of tag entries 228 and a set of identifier blocks 230. Tag "B" is stored in a tag entry 228 of the dead block tag way 200, and an identifier (such as a pointer) is stored in a corresponding identifier block 230 of the dead block tag way 200. In the illustrated embodiment, the identifier is a pointer which acts as a data way index and is depicted as bits (labeled "00") indicating in which data way 206, 207, 208, 209 data "B" resides. In some embodiments, the identifier comprises a one-hot bit vector (e.g., "0001" points to way "I", "0010" points to way "II", "0100" points to way "III", and "1000" points to way "IV"). Unlike the depiction of tag ways 211, 212, 213, 214, labeled "I"-"IV", in some embodiments, the tag entries 228 of the dead block tag way 200 do not statically correspond to specific data blocks 216, 217, 218, 219, 220. Instead, the identifier may also indicate in which data block 216, 217, 218, 219, 220 (or "row") data "B" resides.

Figure 3:
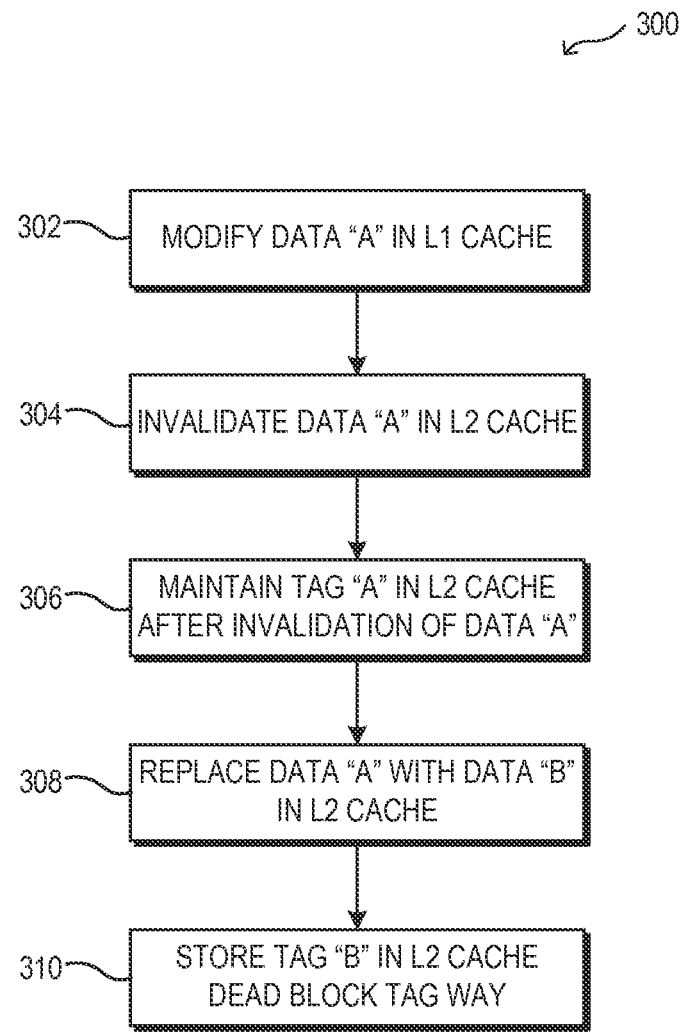
FIG. 3 is a flow diagram illustrating a method for implementing a cache block repurposing scheme for the cache hierarchy of the processing system of FIG. 1 in accordance with some embodiments.

FIG. 3 is a flow diagram illustrating a method 300 for implementing a cache block repurposing scheme for the cache hierarchy 102 of the processing system 100 of FIG. 1 in accordance with some embodiments. At block 302, the processing system 100 modifies data "A" in the L1 cache 108. For example, one of the processing cores 114, 115, may write data to the cache line 124 where data "A" was residing, modifying data "A". Since the cache hierarchy 102 employs a write-back policy, the modified data is not yet written to the corresponding cache line 126 of the L2 cache 110, and thus, data "A" residing in the corresponding cache line 126 of the L2 cache 110 is now stale data.

At block 304, the cache controller 122 invalidates data "A" of cache line 126 of the L2 cache 110 since it is now stale data as a result of the modification of data "A" in the L1 cache 108. The cache controller 122 may invalidate data "A" of the L2 cache by flipping a bit, for example a valid bit, by adding dead cache block 128 to the dead cache block list 130, or the like.

Since the cache hierarchy 102 employs an inclusive scheme such that the L2 cache 110 is inclusive of the L1 cache 108, even though data "A" is invalid, corresponding tag "A" may still be valid and necessary to track coherence information as part of a cache coherence scheme, sharers (i.e., which cores 114, 115 have copies), and the like. Therefore, at block 306, the cache controller 122 maintains tag "A" associated with dead cache block 128 in the L2 cache 110 after the invalidation of data "A". The cache controller 122 may maintain tag "A" in any of a variety of manners, for example, tag "A" may have an associated state bit to indicate whether the tag is valid.

At block 308, the cache controller 122 repurposes the dead cache block 128 by replacing data "A" with data "B" at cache line 126 of the L2 cache 110. Data "B" may be any of a variety of new data 132, for example, compressed data, duplicate data, prefetch data, or data evicted from the L1 cache 108. Since tag "A" is maintained in accordance with block 306, tag "B" (associated with data "B") cannot be stored in cache line 126 of the L2 cache 110 with data "B". As such, at block 310, the cache controller 122 stores tag "B" in the dead block tag way 136. The dead block tag way 136 also comprises an identifier to indicate the location of data "B" in the L2 cache 110. As a result, tag "A" is still available for cache coherence purposes or otherwise, and the cache hierarchy 102 is made more efficient by repurposing otherwise unused dead cache blocks 128.

Figure 4:
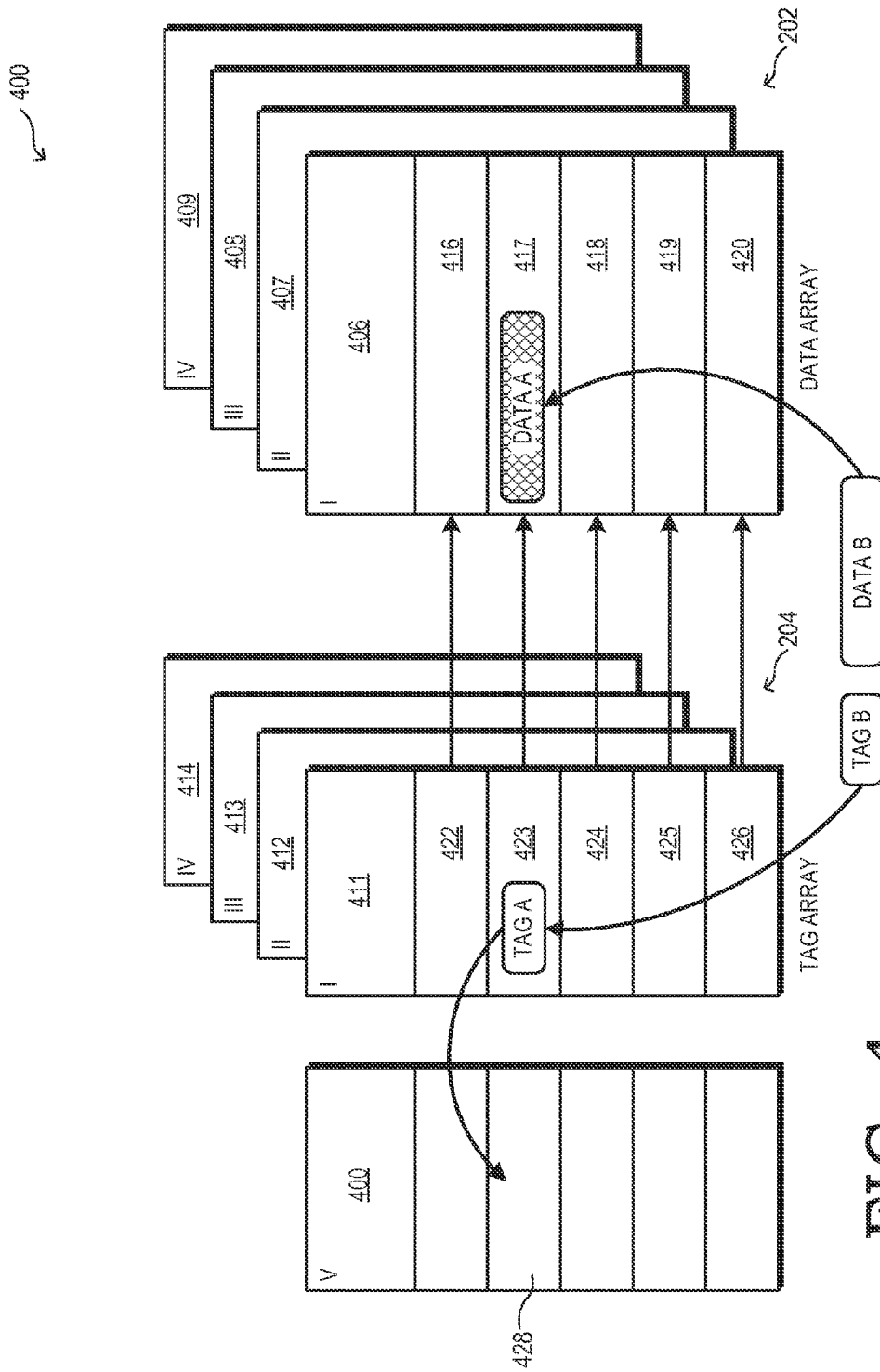
FIG. 4 is a block diagram of a cache of the processing system of FIG. 1 employing a cache coherence tag way in accordance with some embodiments.

FIG. 4 is a block diagram of the L2 cache 110 of the processing system 100 of FIG. 1 employing a cache coherence tag way 400 in accordance with some embodiments. The L2 cache 110 comprises a data array 402 (or other cache line array) and a corresponding tag array 404. The data array comprises a plurality of data ways 406, 407, 408, 409, and the tag array comprises a plurality of tag ways 411, 412, 413, 414. While the illustrated embodiment depicts four (labeled, "I"-"IV") data ways 406, 407, 408, 409 and corresponding tag ways 411, 412, 413, 414, in other embodiments, the cache 110 may comprise any number of data ways in the data array with a corresponding number of tag ways in the tag array. Each data way 406, 407, 408, 409 comprises a plurality of data blocks 416, 417, 418, 419, 420, and each tag way 411, 412, 413, 414 comprises a corresponding plurality of tag entries 422, 423, 424, 425, 426, such that together, the plurality of data blocks 416, 417, 418, 419, 420 and the plurality of tag entries 422, 423, 424, 425, 426 make up a plurality of cache lines.

As described above with reference to FIG. 1, once data "A" is invalidated, the cache controller 122 identifies data block 417 as a dead cache block. Normally, the dead cache block 417 would remain unused until a write is performed based on the write policy. Unused dead cache blocks make for inefficient caches since the unused space could otherwise be filled with data and avoid unnecessary cache misses, cache re-fetches, lower performance, and higher power consumption. In an effort to repurpose the dead cache block 417, the cache controller 122 may allocate new data "B" to dead cache block 417. New data "B" may be any of a variety of data, including prefetch data, compressed data, data evicted from a different cache, and the like.

In the illustrated embodiment, tag "A" is still valid and needed for a cache coherence scheme or otherwise. To make room for tag "B" at tag entry 423 while still maintaining tag "A", the L2 cache 110 moves tag "A" to the cache coherence tag way 400. Since tag "A" no longer resides in tag entry 423, the cache controller 122 stores tag "B" (associated with data "B" now stored in dead cache block 417) at the corresponding tag entry 423. While the L2 cache 110 data array comprises N data ways (depicted as four ways labeled "I"-"IV"), the tag array comprises at least N+1 tag ways (depicted as five ways labeled "I"-"V") to allow for one or more additional ways (depicted as a single way labeled "V") to maintain tags associated with dead cache blocks for cache coherence purposes. Tag "B" is stored in a tag entry 428 of the cache coherence tag way 400. Unlike tag ways 411, 412, 413, 414, labeled "I"-"IV", in some embodiments, the tag entries 428 of the cache coherence tag way 400 need not statically correspond to specific data blocks 416, 417, 418, 419, 420.

Figure 5:
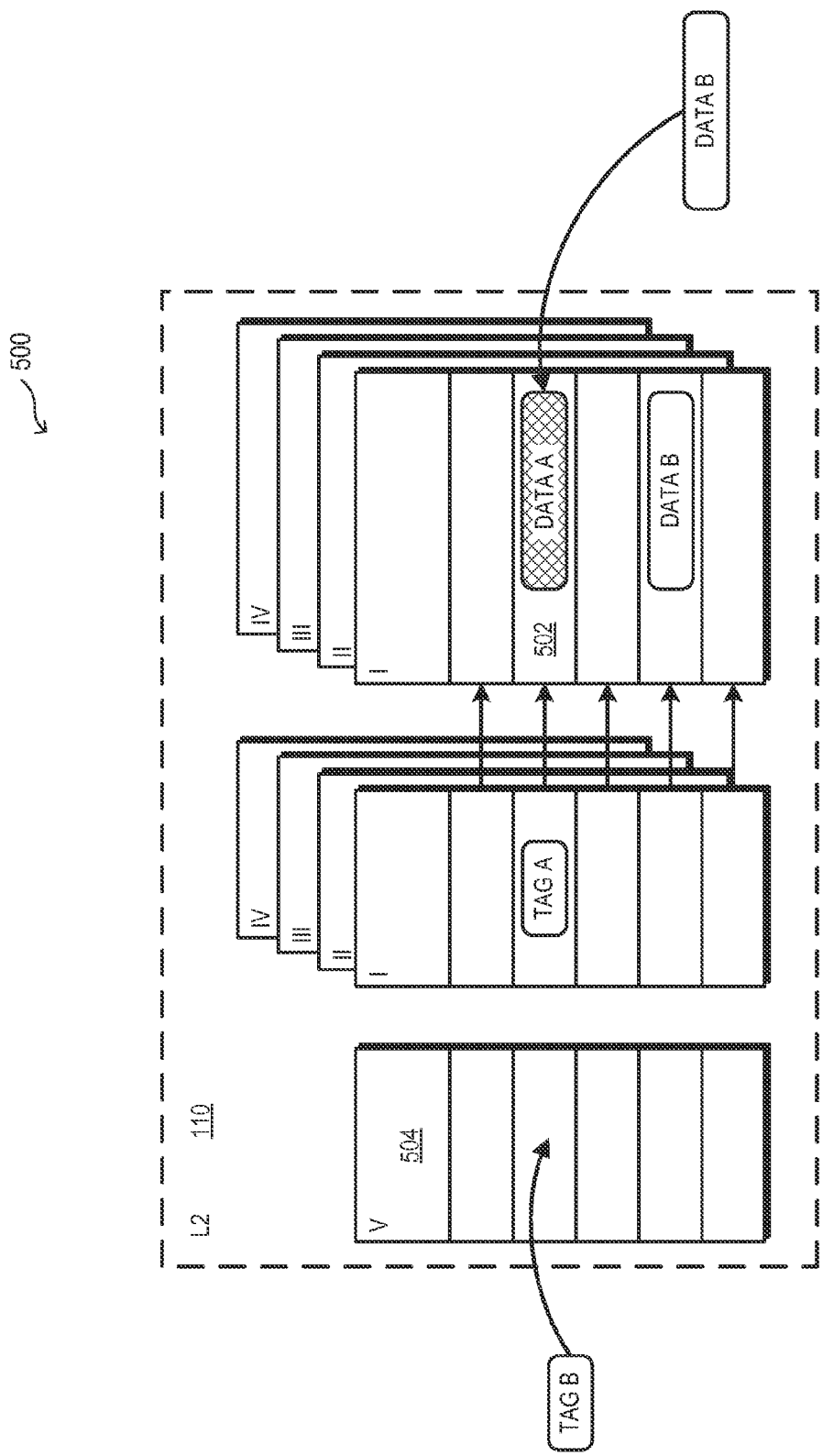
FIG. 5 is a block diagram illustrating an example operation of the method of FIG. 3 on the cache hierarchy 102 of FIG. 1 using duplicate data in accordance with some embodiments.
Figure 6:
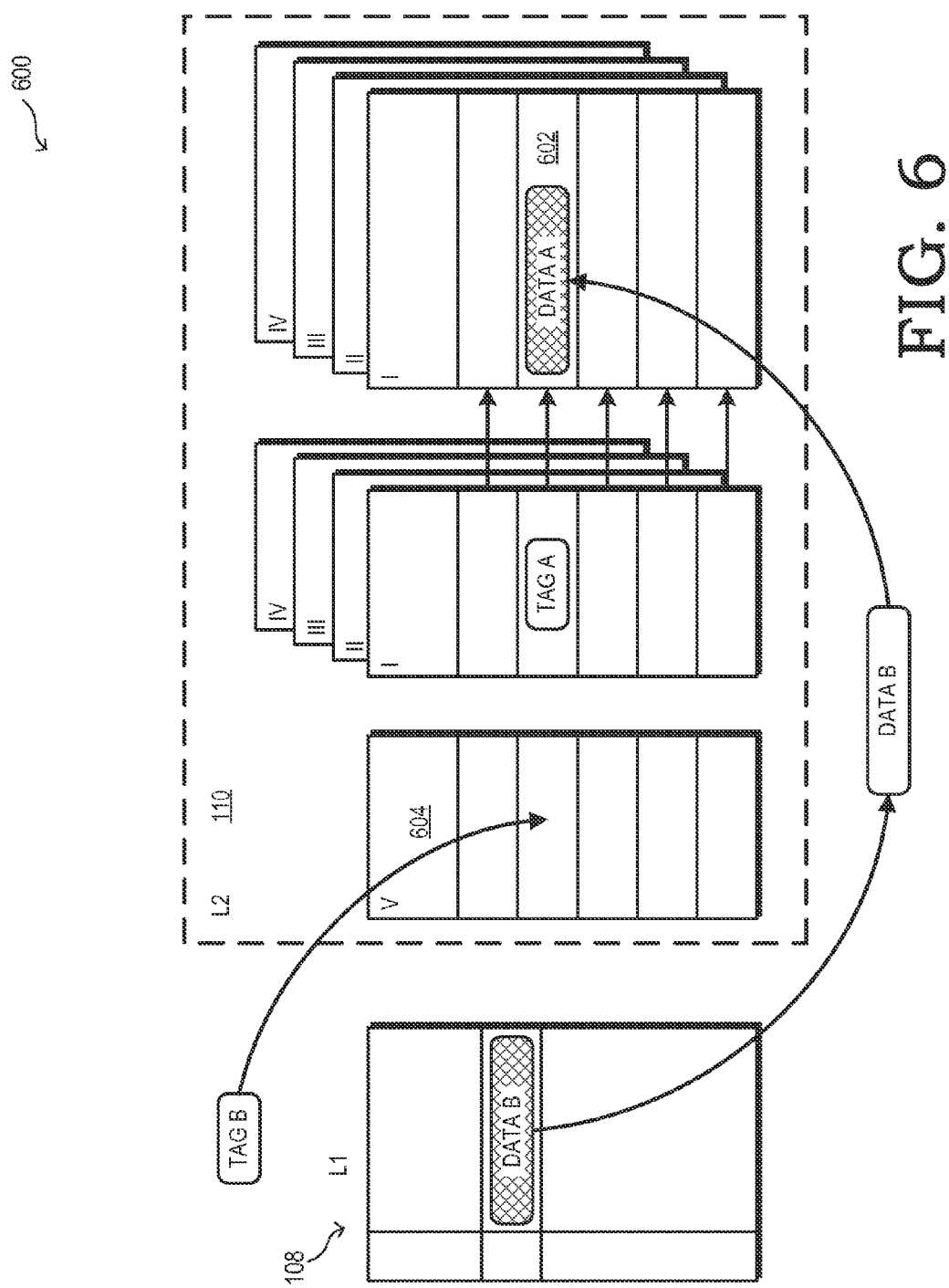
FIG. 6 is a block diagram illustrating an example operation of the method of FIG. 3 on the cache hierarchy 102 of FIG. 1 using evicted data in accordance with some embodiments.
Figure 7:
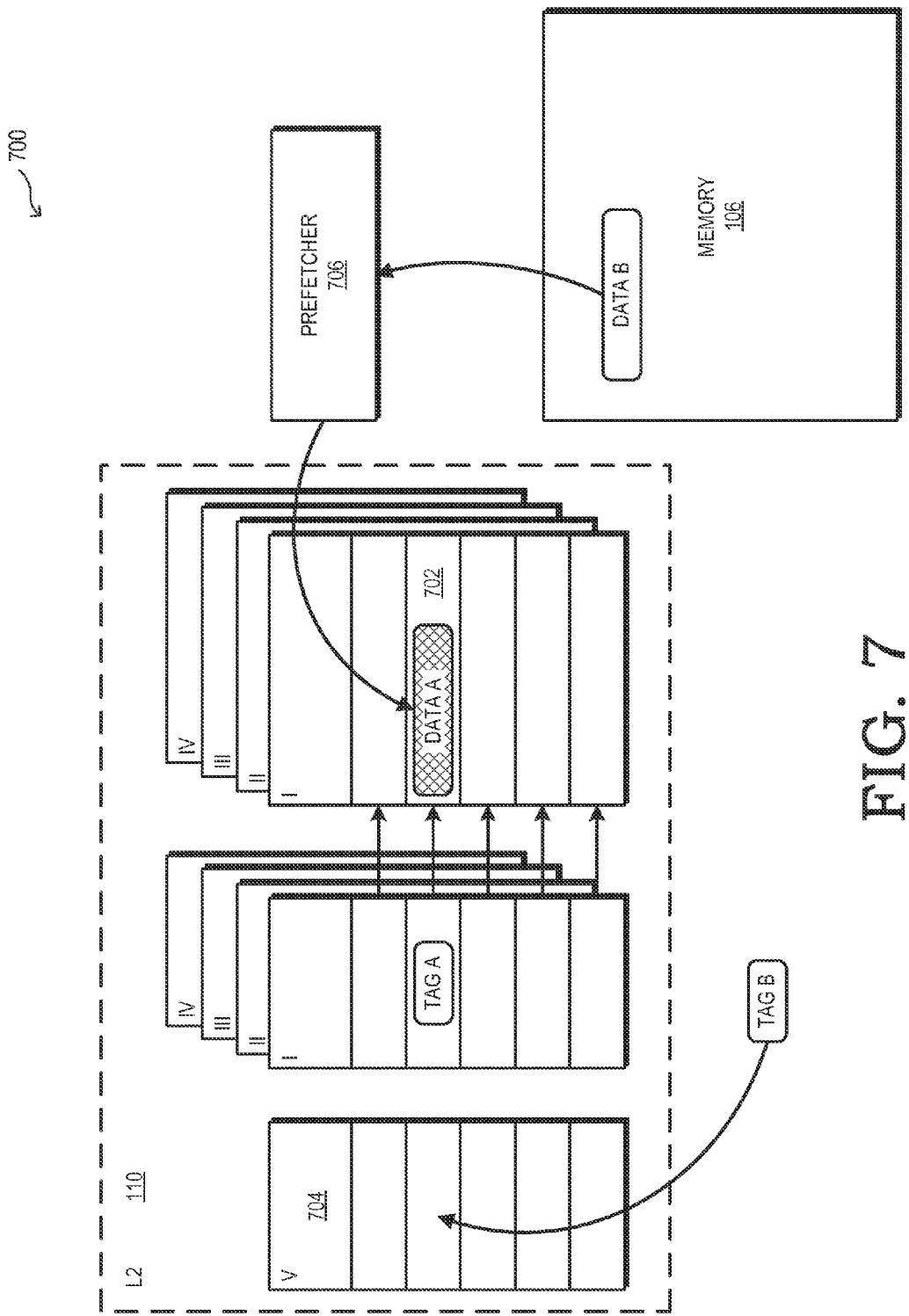
FIG. 7 is a block diagram illustrating an example operation of the method of FIG. 3 on the cache hierarchy 102 of FIG. 1 using prefetch data in accordance with some embodiments.

FIGS. 5-7 illustrate example operations of the method 300 of FIG. 3 on the cache hierarchy 102 of FIG. 1. While these example operations are described separately, some embodiments may employ any combination of these operations within the same cache hierarchy 102, or even within the same cache 108, 110, 112. For example, in some embodiments, the cache hierarchy 102 may employ the example operations of FIG. 5, FIG. 6 and FIG. 7, repurposing the dead cache blocks for the different types of data as needed.

FIG. 5 is a block diagram illustrating an example operation 500 of the method 300 of FIG. 3 on the cache hierarchy 102 of FIG. 1 using duplicate data to increase reliability in accordance with some embodiments. Caches sometimes suffer faults due to a variety of reasons, for example, high-energy particle strikes, power supply noise, high chip temperatures, circuitry failures, and the like. Conventionally, techniques such as including error-correcting codes (ECCs) in the cache are used to increase the reliability of the cache in the presence of errors. However, in some cases it may be desirable to provide a higher level of protection for certain data, for example for highly sensitive data, particularly vulnerable data blocks (i.e., higher error correction rates), and the like. In these cases, one or more duplicate copies of data can be made in the cache so that if any one copy is corrupted, the correct data may still be correctly provided by the other duplicates. To reduce the space overhead of these additional copies, the cache controller 122 repurposes a dead cache block 502 to store the duplicate data (data "B") and stores its correspond tag "B" in a dead block tag way 504 while maintaining tag "A" for cache coherence purposes.

FIG. 6 is a block diagram illustrating an example operation 600 of the method 300 of FIG. 3 on the cache hierarchy 102 of FIG. 1 using evicted data to increase associativity in accordance with some embodiments. In the illustrated embodiment, dead cache block 602 at the L2 cache 110 serves as a victim buffer for data "B" when it is evicted from the L1 cache 108, while tag "B" associated with victim data "B" is stored in a dead block tag way 604. Similarly, the L2 cache may serve as a victim buffer for itself by temporarily storing a copy of evicted cache lines in the dead cache block 602. Alternatively, the dead cache block 602 of the L2 cache 110 may be repurposed to store new data so that a cache line does not need to be evicted to make room for the new data. Generally, when new data is added to the L2 cache, the cache controller 122 uses a replacement policy (e.g., least recently used (LRU), pseudo-LRU, not recently used (NRU), first in first out (FIFO), least frequently used (LFU), re-reference interval prediction (RRIP), random, a combination of these, and the like) to select a victim cache line residing in the L2 cache 110 that is least likely to be used by the processing system 100 in the future. Instead, in some embodiments, the cache controller 122 may repurpose the dead cache blocks 602 to store the new data, and therefore the victim cache line does not have to be evicted from the L2 cache 110 to make room for the new data. While described in the context of the L2 cache 110, these techniques could similarly be applied to dead cache blocks in any cache.

FIG. 7 is a block diagram illustrating an example operation 700 of the method of FIG. 3 on the cache hierarchy 102 of FIG. 1 using prefetch data in accordance with some embodiments. In the illustrated embodiment, the processing system 100 includes a prefetcher 706, which anticipates data likely to be used by the processing cores 114, 115 and prefetches this data (data "B") as prefetch data from the system memory 106 into the cache hierarchy 102 in an effort to increase efficiency of the processing system 100. In some embodiments when prefetching data in to the L2 cache 110, the prefetcher 706 first attempts to identify an invalid cache line (with both the tag and the data invalid) for storage of the prefetch data. If an invalid cache line cannot be found, the prefetcher 706 uses a dead cache block 702 to store the prefetch data, and stores the associated tag (tag "B") in the a dead block tag way 704. Repurposing dead cache blocks to store prefetch data allows more prefetch data to be stored than would otherwise be possible, increasing the efficiency of the processing system 100.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
responsive to invalidation of first data of a cache line of a first cache of a processing system employing a write-back caching policy:
repurposing the cache line to concurrently store, at the cache line, second data and a first tag associated with the first data for a cache coherence scheme of the processing system, wherein the cache line maintains the first tag after storing the second data in the cache line.

2. The method of claim 1, wherein repurposing the cache line includes associating a second tag with the second data.

3. The method of claim 2, wherein:
the first cache comprises a cache line array having N ways and a tag array having at least N+1 ways;
the first tag is stored in a first tag entry of a first way of the tag array; and
the second tag is stored in a second tag entry of a second way of the tag array.

4. The method of claim 3, wherein repurposing the cache line further comprises:
moving the first tag from the second tag entry of the second way to the first tag entry of the first way; and
storing the second tag in the second tag entry of the second way after moving the first tag.

5. The method of claim 3, wherein:
the cache line comprises a cache line of the first way of the cache line array; and
the second tag comprises an identifier associated with the first way of the cache line array.

6. The method of claim 1, wherein repurposing the cache line comprises:
prefetching the second data from a memory; and
storing the prefetched second data to the cache line.

7. The method of claim 1, wherein repurposing the cache line comprises:
storing a duplicate of third data of the first cache as the second data in the cache line.

8. The method of claim 1, wherein repurposing the cache line comprises:
compressing third data to generate the second data; and
storing the second data in the cache line.

9. The method of claim 1, wherein repurposing the cache line comprises:
storing the second data in the cache line in response to eviction of the second data from a second cache.

10. The method of claim 1, further comprising:
invalidating the first data responsive to modification of a cache line of a second cache, the cache line of the second cache corresponding to the cache line of the first cache.

11. A method comprising:
invalidating a first data block of a cache line of a first cache responsive to a modification of the first data block at a second cache, the first data block associated with a first tag of the first cache;
responsive to identifying the first data block as invalid, replacing the first data block in the cache line of the first cache with a second data block; and
associating a second tag in the first cache with the second data block while maintaining the first tag in the cache line of the first cache, wherein the first cache and the second cache maintain a write-back caching policy, and further wherein the cache line of the first cache maintains the first tag after replacing the first data block with the second data block to concurrently store both the first tag and the second data block in the cache line.

12. The method of claim 11, wherein:
the first tag is stored in a first way of a tag array of the first cache; and
wherein associating the second tag comprises concurrently storing the second tag in a second way of the tag array.

13. The method of claim 11, wherein the second data block comprises at least one of: prefetched data; compressed data; duplicate data; and data evicted from the second cache.

14. A system comprising:
a cache hierarchy comprising a first cache and a second cache; and
a cache controller to, in response to invalidation of first data at a cache line of the first cache, repurpose the cache line to concurrently store, at the cache line, a second data and a first tag associated with the first data for a cache coherence scheme, wherein the cache line maintains the first tag after storing the second data in the cache line.

15. The system of claim 14, wherein the cache hierarchy employs a write-back caching policy.

16. The system of claim 14, wherein the cache controller is to repurpose the cache line at least in part by associating a second tag with the second data.

17. The system of claim 16, wherein:
the first cache comprises a cache line array having N ways and a tag array having at least N+1 ways;
the first tag is stored in a first tag entry of a first way of the tag array; and
the second tag is stored in a second tag entry of a second way of the tag array.

18. The system of claim 17, wherein:
the cache line comprises a cache line of the first way of the cache line array; and
the second tag comprises an identifier associated with the first way of the cache line array.

19. The system of claim 14, wherein the cache controller further is to:
invalidate the first data responsive to modification of a cache line of a second cache, the cache line of the second cache corresponding to the cache line of the first cache.

20. The system of claim 14, wherein the second data comprises at least one of: prefetched data; compressed data; duplicate data; and data evicted from a second cache.

* * * * *